United States Patent
Angappan et al.

(10) Patent No.: US 11,740,765 B2
(45) Date of Patent: Aug. 29, 2023

(54) SYSTEM AND METHOD FOR USE OF BROWSER EXTENSION FOR DATA EXPLORATION IN AN ANALYTICS ENVIRONMENT

(71) Applicant: Oracle International Corporation, Redwood Shores, CA (US)

(72) Inventors: Ganesh Angappan, Sunnyvale, CA (US); Arthi Vigneshwari, Karaikudi (IN); Chen-Ping Liao, San Ramon, CA (US); Wenjun Guan, Foster City, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 17/525,782

(22) Filed: Nov. 12, 2021

(65) Prior Publication Data
US 2023/0152939 A1   May 18, 2023

(51) Int. Cl.
*G06F 3/048*    (2013.01)
*G06F 3/0482*   (2013.01)
*G06F 16/248*   (2019.01)
*G06F 3/0484*   (2022.01)

(52) U.S. Cl.
CPC ......... *G06F 3/0482* (2013.01); *G06F 3/0484* (2013.01); *G06F 16/248* (2019.01)

(58) Field of Classification Search
CPC .... G06F 3/0482; G06F 3/0484; G06F 16/248; G06F 16/254; G06Q 30/0201
See application file for complete search history.

(56) References Cited

U.S. PATENT DOCUMENTS

| | | | |
|---|---|---|---|
| 10,437,428 B2 * | 10/2019 | Callaghan | G06F 3/0484 |
| 2022/0083979 A1 * | 3/2022 | Gulati | G06N 20/00 |
| 2022/0108381 A1 * | 4/2022 | Korganowski | G06F 16/951 |

* cited by examiner

*Primary Examiner* — Thanh T Vu
(74) *Attorney, Agent, or Firm* — TUCKER ELLIS LLP

(57) ABSTRACT

In accordance with an embodiment, described herein is a system and method for providing a browser extension for exploration in an analytics environment. A data analytics environment can operate at a computer system providing access to a database or data warehouse instance. At a client device, a browser extension can be made available whereby a user can explore a table of interest at an online data content resource, such as at a web site or web page, and instruct the browser extension to import, sanitize, and begin analysis of the table within the analytics environment. The approach can be used, for example, to identify tables or other arrangements of data provided by a web site, and present options to the user to retrieve the data into the analytics environment, for further review or to create visualizations associated with the data.

12 Claims, 15 Drawing Sheets

SYSTEM AND METHOD FOR USE OF BROWSER EXTENSION FOR DATA EXPLORATION IN AN ANALYTICS ENVIRONMENT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments described herein are generally related to data analytics, and computer-based methods of providing business intelligence or other types of data, and are particularly related to a system and method for providing a browser extension for data exploration in an analytics environment.

BACKGROUND

Generally described, within an organization, data analytics enables the computer-based examination or analysis of large amounts of data, in order to derive conclusions or other information from that data; while business intelligence tools provide an organization's business users with information describing their enterprise data in a format that enables those business users to make strategic business decisions.

In some instances, a user may wish to use data derived from various sources in generating useful information. For example, a user may manually select and copy the contents of a table displayed at a web page to a spreadsheet, and then perform various manipulations of the data, in order run reports on the data.

However, the process of copying data from different sources can be labor-extensive, and depending on the particular source such data content may not be provided in a HTML table or easily-accessible tabular format. Additionally, a simple select-and-copy approach may not lend itself to the overall context of how the data is being used at the data resource.

SUMMARY

In accordance with an embodiment, described herein is a system and method for providing a browser extension for exploration in an analytics environment. A data analytics environment can operate at a computer system providing access to a database or data warehouse instance. At a client device, a browser extension can be made available whereby a user can explore a table of interest at an online data content resource, such as at a web site or web page, and instruct the browser extension to import, sanitize, and begin analysis of the table within the analytics environment.

The approach can be used, for example, to identify tables or other arrangements of data provided by a web site, and present options to the user to retrieve the data into the analytics environment, for further review or to create visualizations associated with the data.

In accordance with an embodiment, the system enables data to be retrieved from an online data content resource in a manner that reflects the overall context of how the data is being used at the data resource, through the use of different types of data scrapers, or custom scrapers, that are adapted for use with their displayed data formats.

In accordance with an embodiment, technical advantages of the described approach include that the system can employ data scrapers that are appropriate to different types of online data content resources, to quickly and easily retrieve tables or other arrangements of data from the online data content resources into the analytics environment. For example, additional connectors can be used to create tables from different types of source data. The data provided by the online data content resources can then be reviewed or visualized within the analytic environment.

DETAILED DESCRIPTION

As described above, within an organization, data analytics enables the computer-based examination or analysis of large amounts of data, in order to derive conclusions or other information from that data; while business intelligence tools provide an organization's business users with information describing their enterprise data in a format that enables those business users to make strategic business decisions.

For example, in accordance with an embodiment, an analytics environment enables data analytics within the context of an organization's enterprise software application or data environment, or a software-as-a-service or other type of cloud environment; and supports the development of computer-executable software analytic applications.

Figure 1:
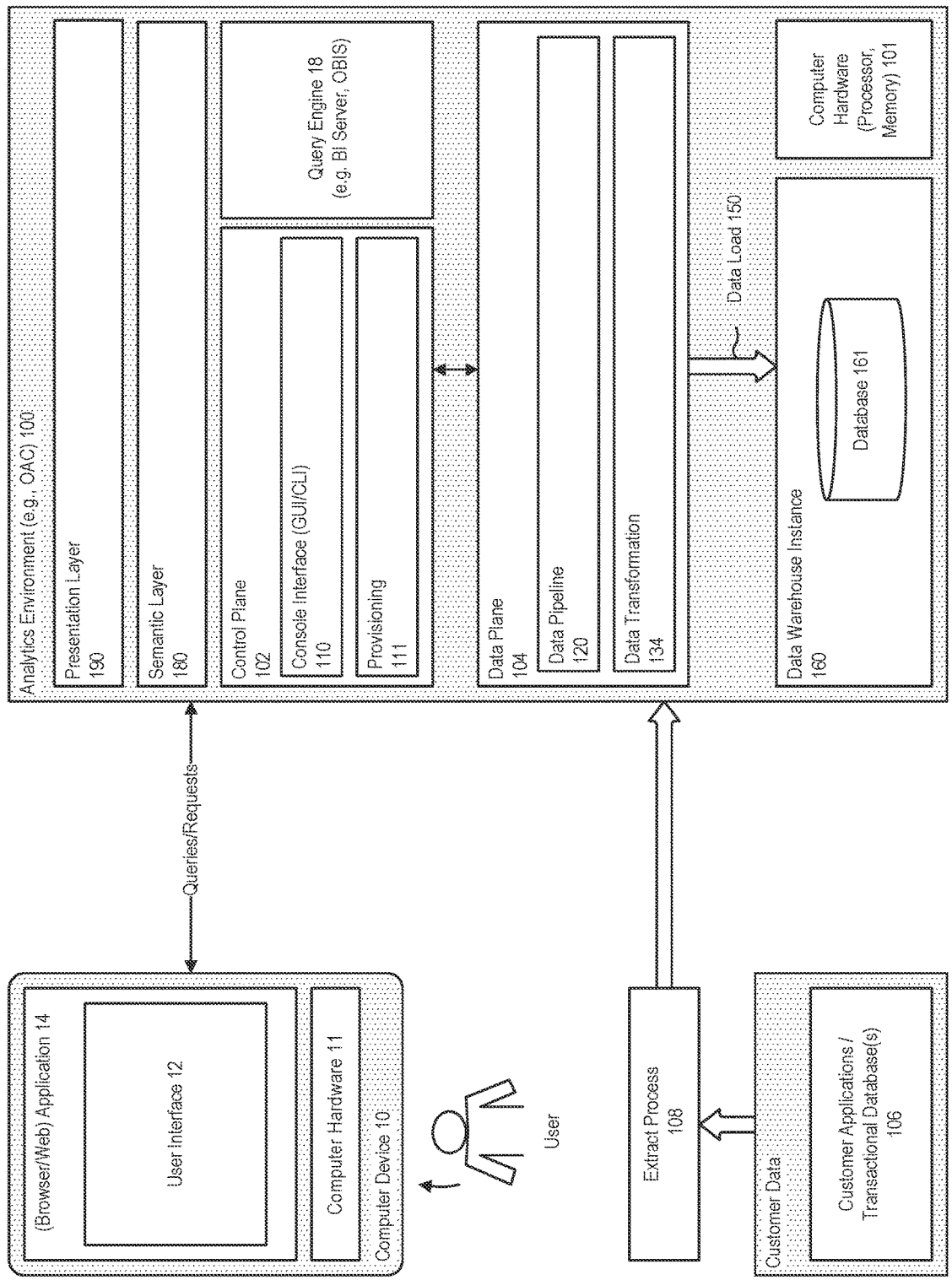
FIG. 1 illustrates an example data analytics system, in accordance with an embodiment.

FIG. 1 illustrates an example data analytics system, in accordance with an embodiment.

The example shown and described in FIG. 1 is provided for purposes of illustrating an example of one type of data analytics environment. In accordance with an embodiment, the components and processes illustrated in FIG. 1, and as further described herein with regard to various other embodiments, can be provided as software or program code executable by a computer system or other type of processing device. For example, the components and processes described herein can be provided by a cloud computing system, or other suitably-programmed computer system.

As illustrated in FIG. 1, in accordance with an embodiment, an analytics environment 100 can be provided by, or otherwise operate at, a computer system having a computer hardware (e.g., processor, memory) 101, and including one or more software components operating as a control plane 102, and a data plane 104, and providing access to a data warehouse instance 160 and database 161.

In accordance with an embodiment, the control plane operates to provide control for cloud or other software products offered within the context of a SaaS or cloud environment, such as, for example, an Oracle Analytics Cloud environment. For example, in accordance with an embodiment, the control plane can include a console interface 110 that enables access by a customer (tenant) and/or a cloud environment having a provisioning component 111.

In accordance with an embodiment, the console interface can enable access by a customer (tenant) operating a graphical user interface (GUI) and/or a command-line interface (CLI) or other interface; and/or can include interfaces for use by providers of the SaaS or cloud environment and its customers (tenants).

In accordance with an embodiment, the provisioning component can be used to update or edit a data warehouse instance, and/or an ETL process that operates at the data plane, for example, by altering or updating a requested frequency of ETL process runs, for a particular customer (tenant).

In accordance with an embodiment, the data plane can include a data pipeline or process layer 120 and a data transformation layer 134, that together process operational or transactional data from an organization's enterprise software application or data environment, such as, for example, business productivity software applications provisioned in a customer's (tenant's) SaaS environment.

In accordance with an embodiment, the data transformation layer can include a data model, such as, for example, a knowledge model (KM), or other type of data model, that the system uses to transform data into a model format understood by the analytics environment.

In accordance with an embodiment, a data pipeline or process can be scheduled to execute at intervals (e.g., hourly/daily/weekly) to extract 108 transactional data from an enterprise software application or data environment, such as, for example, business productivity software applications and corresponding transactional databases 106.

In accordance with an embodiment, after transformation of the extracted data, the data pipeline or process can execute a warehouse load procedure 150, to load the transformed data into the customer schema of the data warehouse instance.

Different customers of a data analytics environment may have different requirements with regard to how their data is classified, aggregated, or transformed, for purposes of providing data analytics or business intelligence data, or developing software analytic applications.

In accordance with an embodiment, to support different customer requirements as to how their data is classified, aggregated, or transformed, a semantic layer 180 can include data defining a semantic model of a customer's data; which is useful in assisting users in understanding and accessing that data using commonly-understood business terms; and provide custom content to a presentation layer 190.

In accordance with an embodiment, the presentation layer can enable access to the data content using, for example, a software analytic application, user interface, dashboard, key performance indicators (KPI's), visualizations; or other type of report or interface as may be provided by products such as, for example, Oracle Analytics Cloud.

In accordance with an embodiment, a user/developer can interact with a client computer device 10 that includes a computer hardware 11 (e.g., processor, storage, memory), user interface 12, and software application 14. A query engine 18 (e.g., OBIS) operates to serve analytical queries within, e.g., an Oracle Analytics Cloud environment, pushes down operations to supported databases, and translates business user queries into appropriate database-specific query languages.

Exploration (Explore) Browser Extension

In some instances, a user may wish to use data derived from various sources in generating useful information. For example, a user may manually select and copy the contents of a table displayed at a web page to a spreadsheet, and then perform various manipulations of the data, in order run reports on the data.

However, the process of copying data from different sources can be labor-extensive, and depending on the particular source such data content may not be provided in a HTML table or easily-accessible tabular format. Additionally, a simple select-and-copy approach may not lend itself to the overall context of how the data is being used at the data resource.

For example, during the process of importing data to an analytics environment, if a source table has null values, then the ordering of data within a created file may change. There may be a need to sanitize the data after copying. Some source data may not copy over properly, such as when the source data includes images, or non-text characters; which then requires further sanitation. Some columns from the source data may include quotes or delimiters within column values, which then requires further sanitizing. Once imported correctly, the new table needs to be saved as, e.g., a CSV file or spreadsheet file. A user would then need to log in to the target analytics environment, upload the file, and start the analysis.

To address these considerations, in accordance with an embodiment, described herein is a system and method for providing a browser extension for exploration in an analytics environment. A data analytics environment can operate at a computer system providing access to a database or data warehouse instance. At a client device, a browser extension can be made available whereby a user can explore a table of interest at an online data content resource, such as at a web site (website) or web page, and instruct the browser extension to import, sanitize, and begin analysis of the table within the analytics environment.

The approach can be used, for example, to identify tables or other arrangements of data provided by a web site, and present options to the user to retrieve the data into the analytics environment, for further review or to create visualizations associated with the data.

Figure 2:
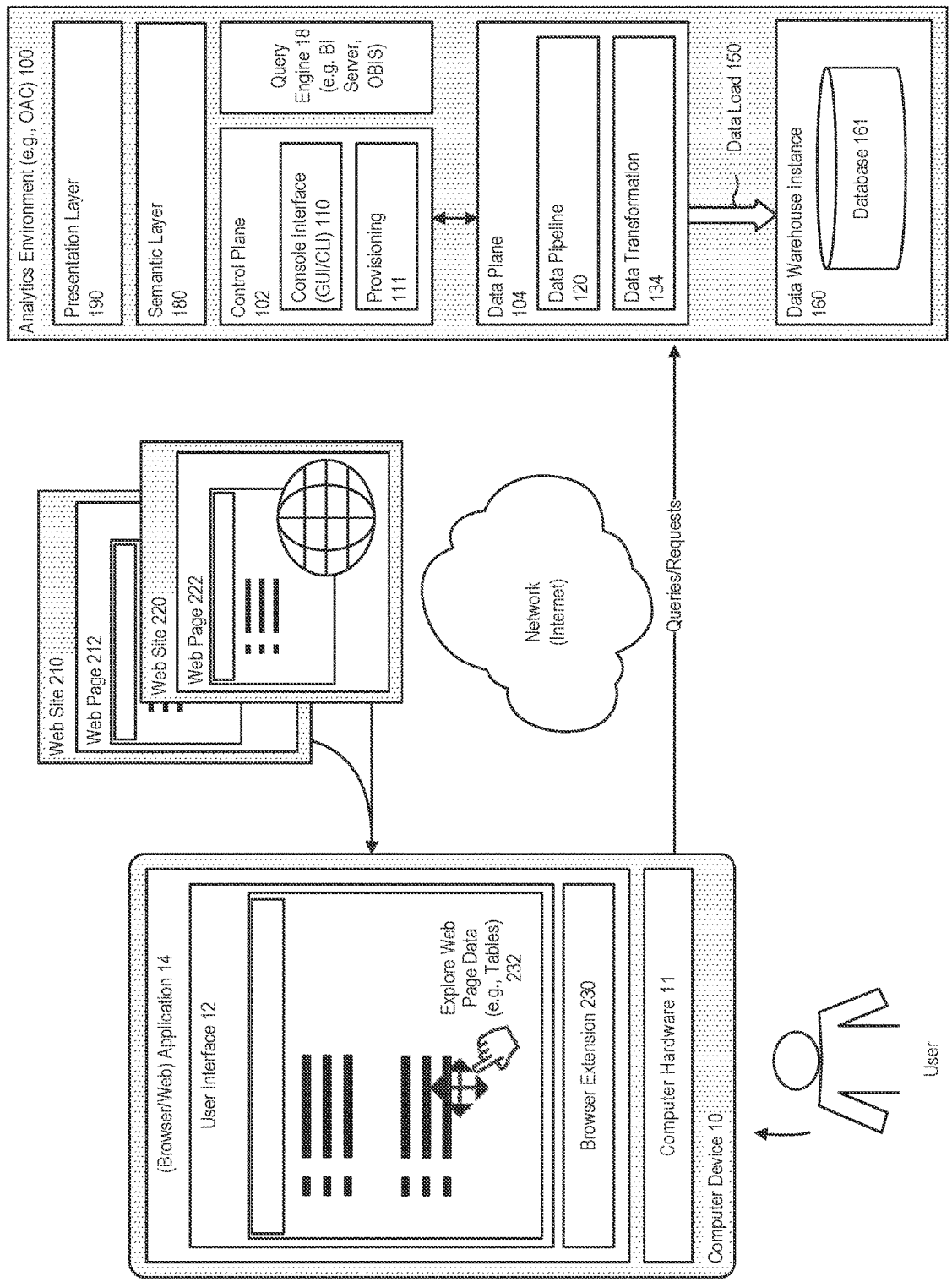
FIG. 2 illustrates a system that provides a browser extension for data exploration in an analytics environment, in accordance with an embodiment.

FIG. 2 illustrates a system that provides a browser extension for data exploration in an analytics environment, in accordance with an embodiment.

As illustrated in FIG. 2, and as described above, a user/developer can interact with a client computer device that includes a computer hardware (e.g., processor, storage, memory), user interface, and software application.

In accordance with an embodiment, the software application can be a web browser or other type of software application that enables access to an online data content resource such as a web page at a web site.

For example, as further illustrated in FIG. 2, in accordance with an embodiment, the software application (e.g., web browser) enables access to an online data content resource, such as one or more web page 212, 222 at a web site 210, 222. In accordance with various embodiments, examples of web browsers include Google Chrome, Mozilla Firefox, and Microsoft Edge; the systems and methods described herein can be used with other types of web browsers and are not restricted to particular types.

In accordance with an embodiment, a browser extension 230 provided at the software application (e.g., web browser) enables a user to explore 232 a table of interest at an online data content resource, such as at a web site or web page, and instruct the browser extension to import, sanitize, and begin analysis of the table within the analytics environment.

For example, in accordance with an embodiment and example use case, once installed, a browser extension can be made available whereby a user of a browser can simply indicate a desirable table on a web site, and the extension can import, sanitize, and begin analysis of the table within an analytics environment, such as Oracle Analytics Cloud.

In accordance with other embodiments, generally described the client computer device can be a mobile device, mobile computing device or other computer-type device adapted for use with a web browser. Examples of such computer devices include laptops, notebook computers, smartphones, and tablets, which are generally adapted to communicate with one or more server systems via a network, for example the Internet.

In accordance with an embodiment, the computer device and the software application includes a user interface provided at a display screen, which can be used to interact with an online data content resource such as a web page at a web site, and display software-generated depictions, views or other visualizations associated with a set of data, examples of which include windows, dialog boxes, displayed tables, or other graphical features or views.

In accordance with an embodiment, particular examples of displayable visualizations can include KPI's and cards, which provide categories of content and associated enterprise data and/or analytics. An interactive visualization may be any visualization that includes or is displayed in association with one or more user interface controls enabling a user interaction with the visualization and/or underlying data, for example by the user able to drill-down, request a change in chart type, pivoting or filtering the data according to particular criteria.

In accordance with an embodiment, the underlying data that is used to generate a visualization for display at the client computer device can represent objects, database dimensions, features, or other data characteristics, for example as provided by a server within an analytics cloud environment.

In accordance with an embodiment, access to various sets of data by a particular user or their computer device can be controlled in accordance with user authentication or other login rights or data permissions associated with the user, including for example, any access permissions provided to a user's device to enable access by that user/device to the particular data at the analytics cloud environment.

Figure 3:
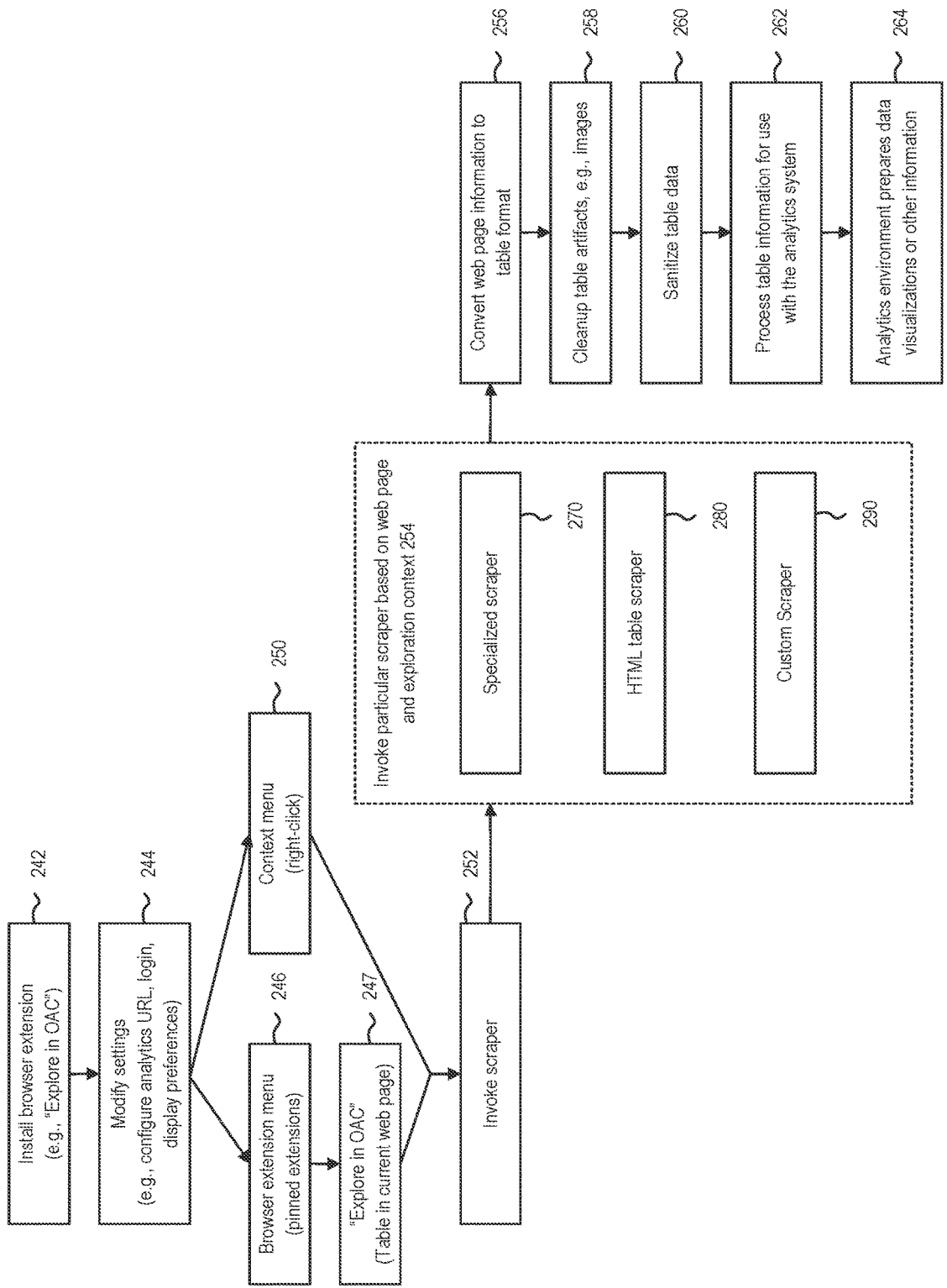
FIG. 3 illustrates the use of a browser extension for data exploration in an analytics environment, in accordance with an embodiment.

FIG. 3 illustrates the use of a browser extension for data exploration in an analytics environment, in accordance with an embodiment.

As illustrated in FIG. 3, in accordance with an embodiment, at 242, the browser extension is installed to the software application (e.g., web browser); and at 244 any required settings can be modified (e.g., a URL used to communicate with the analytics system, login settings, or display preferences).

In accordance with an embodiment, the system enables data to be retrieved (scraped) from an online data content resource in a manner that reflects the overall context of how the data is being used at the data resource, through the use of different types of data scrapers, or custom scrapers, that are adapted for use with their displayed data formats.

For example, in accordance with an embodiment, at 246, the user can elect to use a browser extension to explore a table of interest at an online data content resource, such as at a web site or web page, and at 247, instruct the browser extension to import, sanitize, and begin analysis of the table within the analytics environment.

Alternatively, in accordance with an embodiment, at 250, the user can elect to use a context menu to explore a table or other arrangements of data at an online data content resource in the analytics environment.

In accordance with an embodiment, the browser extension can then, at 252, invoke a data scraper that is appropriate to the particular type of online data content resource, to quickly and easily retrieve tables or other arrangements of data from the online data content resource into the analytics environment. For example, at 254, additional connectors, such as one or more specialized scraper 270, HTML table scraper 280, or customer scraper 290 can be used to create tables from different types of source data.

In accordance with an embodiment, at 256, the information provided by the online data content resource, such as a table of interest at an online data content resource, such as at a web site or web page, can be converted to a table format, based on the operation of the scraper used with that online data content resource.

At 258, table artifacts (e.g., images) can be cleaned-up if necessary; and at 260 the table data sanitized.

At 262, the table information is processed for use with the analytics system; and at 264, the analytics system prepares one or more views or other visualizations or other information associated with a set of data, which can then be used by the client device/user or by another device or user.

For example, in accordance with an embodiment, the browser extension can operate to, for example, identify data tables included on a web site, or a page of a web site, and present options to a user of the program to pull one, some, or all of the data tables into an analytics environment. Once a data table has been selected by a user of the program or extension, the program can automatically redirect the user to an analytics environment, wherein the selected data set has been automatically uploaded and sanitized. Within the analytics environment, based upon the selected data set, for example, data visualizations can be automatically generated for display to, and/or further use by, the user.

Figure 4:
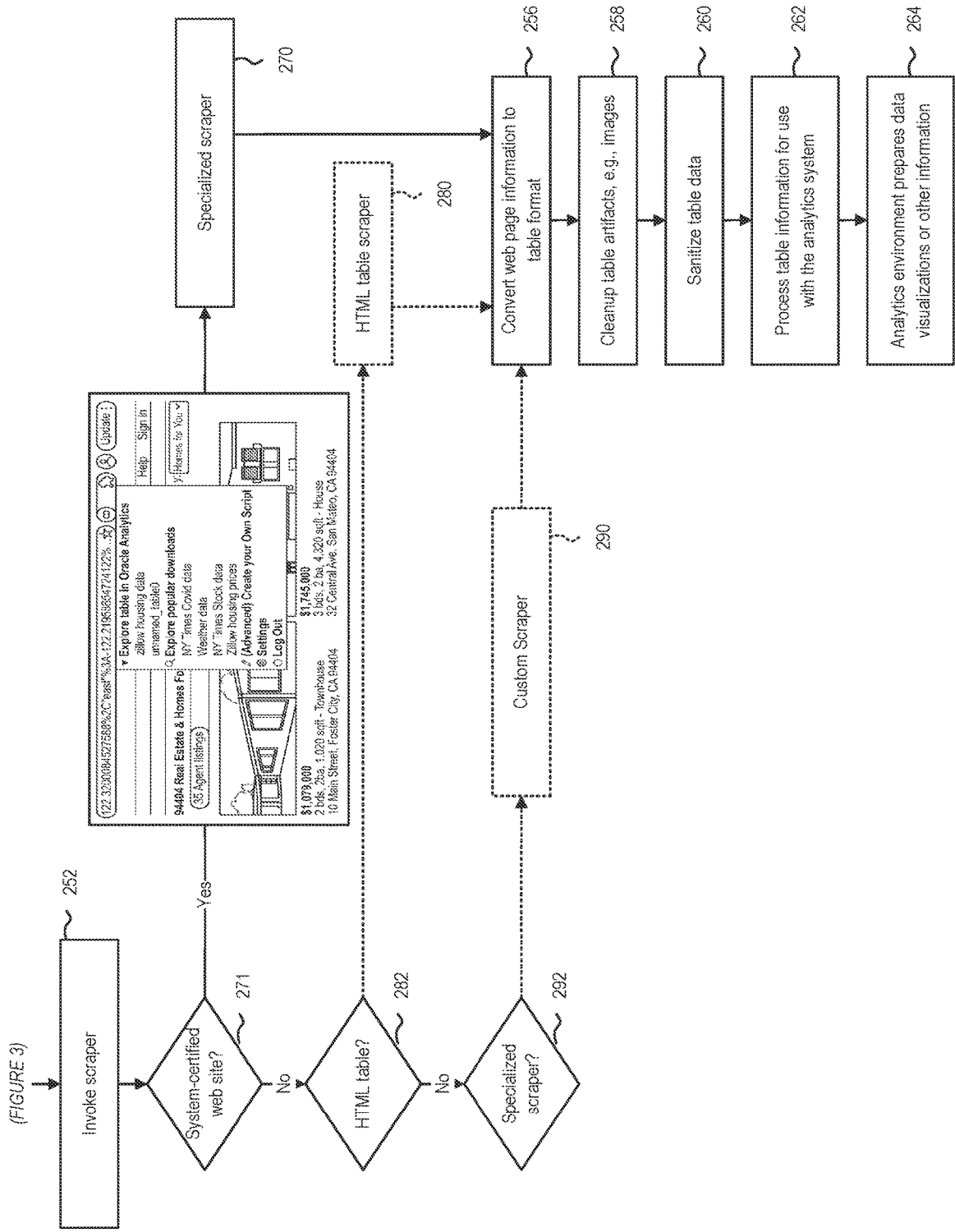
FIG. 4 further illustrates the use of a browser extension for data exploration in an analytics environment, in accordance with an embodiment.

FIG. 4 further illustrates the use of a browser extension for data exploration in an analytics environment, in accordance with an embodiment.

As illustrated in FIG. 4, in accordance with an embodiment and by way of example, when used with a system-certified web site 271, the browser extension can invoke a data scraper that is appropriate to that type of (system-certified web site) online data content resource, to quickly and easily retrieve tables or other arrangements of data from the online data content resource into the analytics environment.

For example, in accordance with an embodiment, the disclosed systems and methods can comprise a library of data mapping tools for use on, for example, specific web sites and/or locations for data sets. On web sites where data is not regularly formatted as an HTML page comprising discrete data tables, the program/extension can identify a data mapping tool from the library for use on a specific web site in order to pull, format, and sanitize relevant data from non-traditional formats. This could be, for example, from e-commerce or online store web sites pages, real estate web sites.

Figure 5:
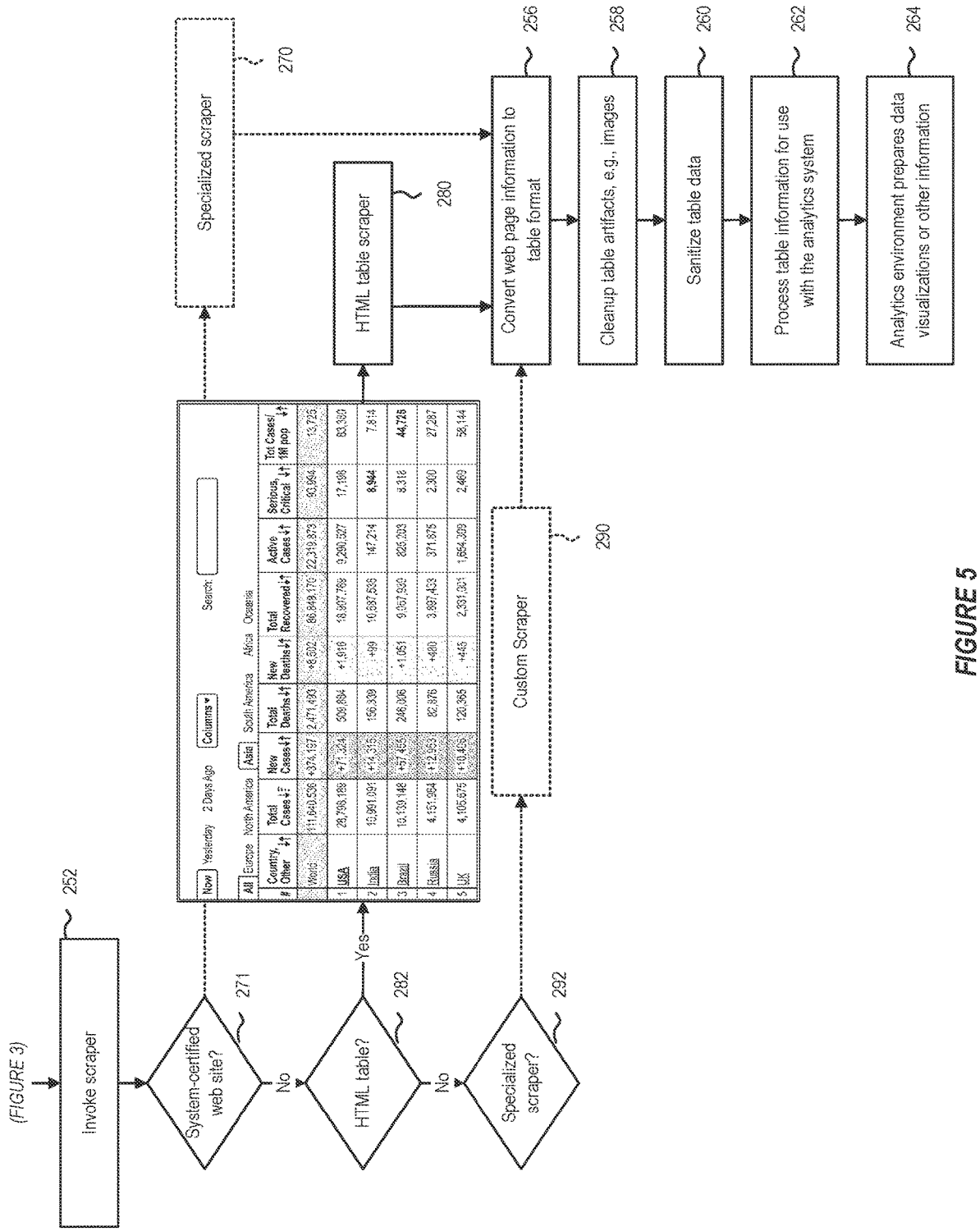
FIG. 5 further illustrates the use of a browser extension for data exploration in an analytics environment, in accordance with an embodiment.

FIG. 5 further illustrates the use of a browser extension for data exploration in an analytics environment, in accordance with an embodiment.

As illustrated in FIG. 5, in accordance with an embodiment and by way of example, when used with an online data content resource such as a web page at a web site that includes an HTML table 282, the browser extension can invoke a data scraper that is appropriate for retrieving data from HTML tables, and provide that data to the analytics environment.

Figure 6:
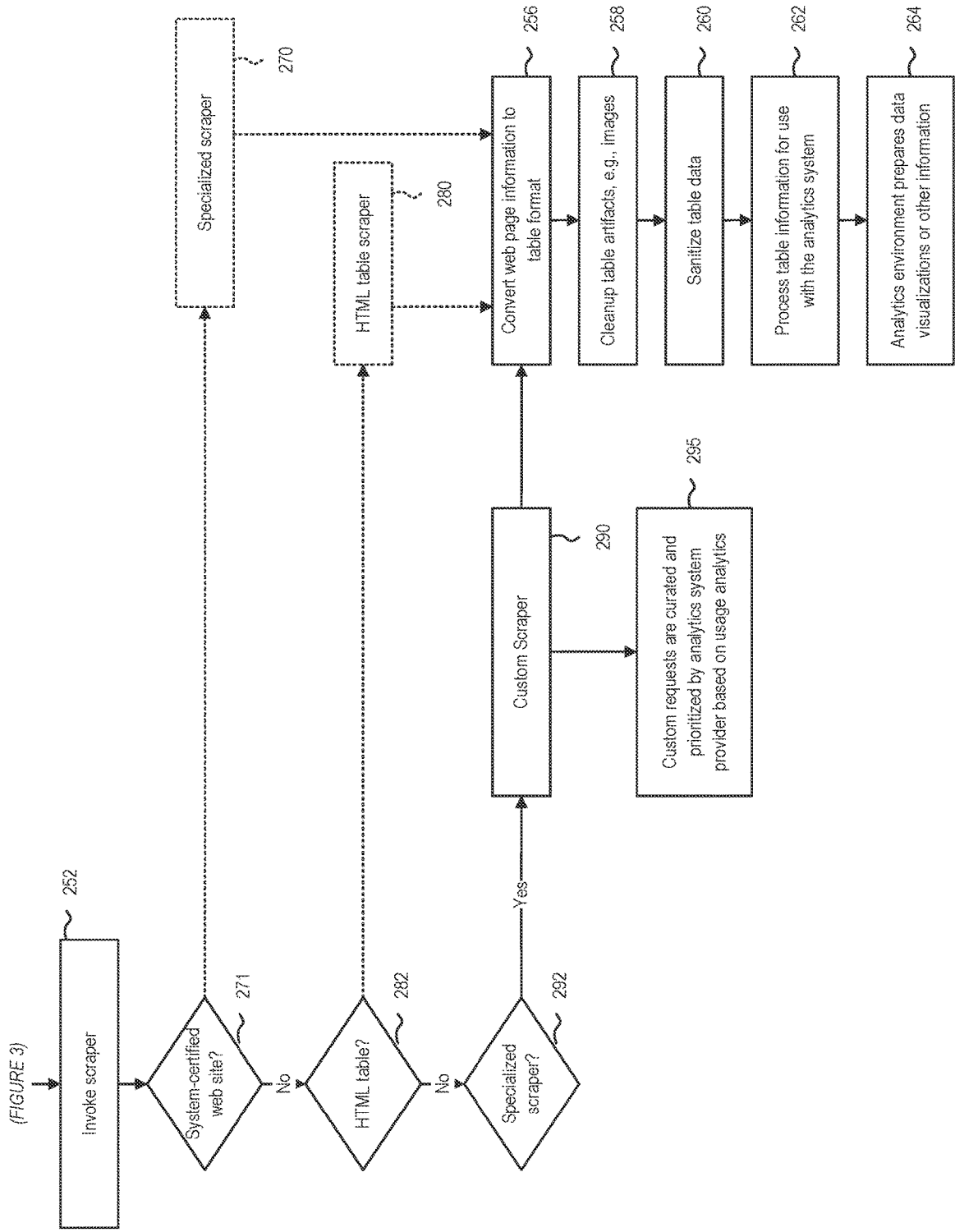
FIG. 6 further illustrates the use of a browser extension for data exploration in an analytics environment, in accordance with an embodiment.

FIG. 6 further illustrates the use of a browser extension for data exploration in an analytics environment, in accordance with an embodiment.

As illustrated in FIG. 6, in accordance with an embodiment, and by way of example, when used with an online data content resource such as a web page at a web site that includes a particular table or other arrangement of data, the browser extension can invoke a custom scraper 290 that is appropriate for retrieving data from particular table or other arrangement of data, and provide that data to the analytics environment. At 295, requests for custom scrapers can be curated and prioritized by the analysis system provided, for example based on usage analytics associated with such data.

Figure 7:
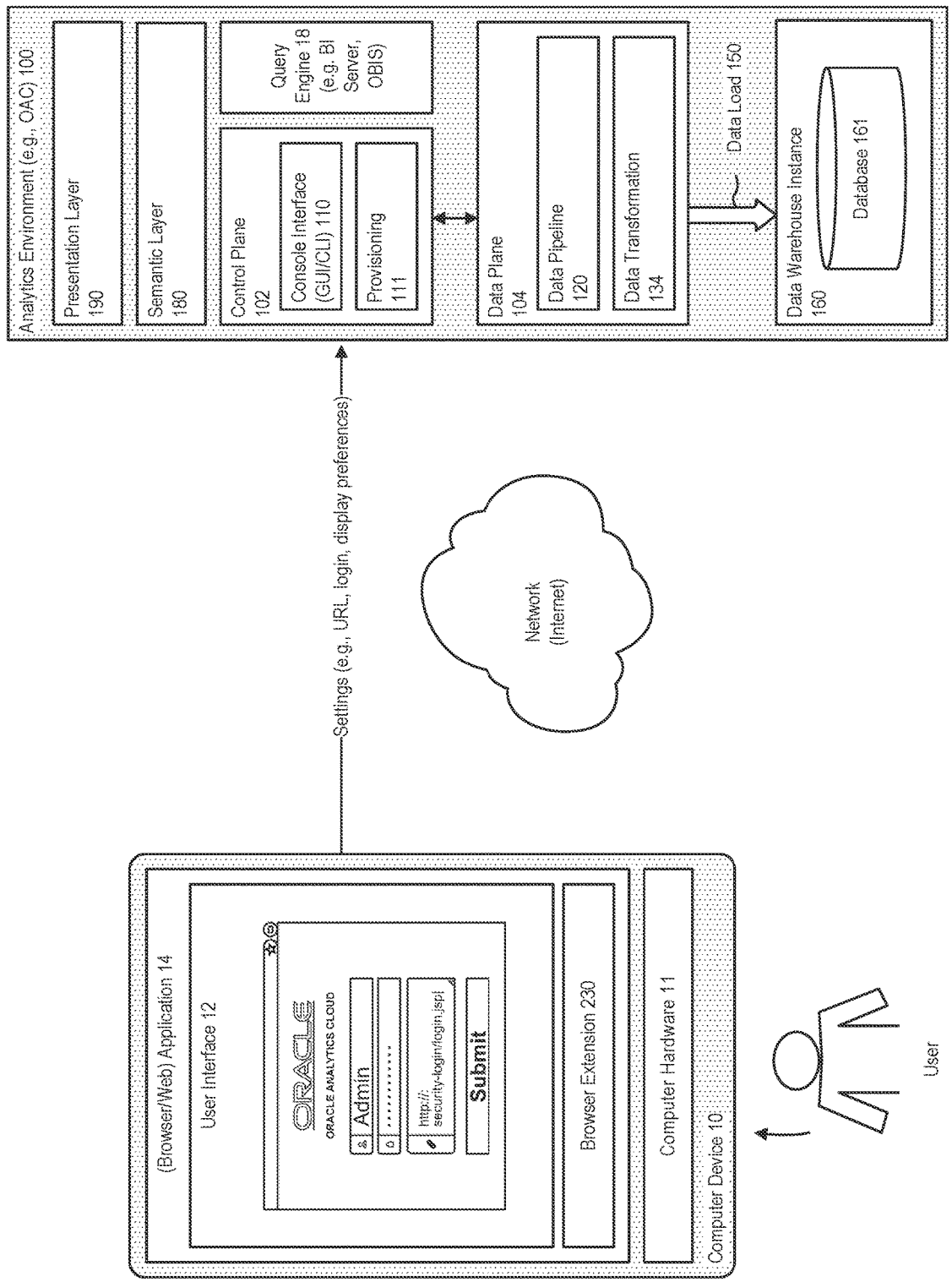
FIG. 7 further illustrates the use of a browser extension for data exploration in an analytics environment, in accordance with an embodiment.

FIG. 7 further illustrates the use of a browser extension for data exploration in an analytics environment, in accordance with an embodiment.

As illustrated in FIG. 7, in accordance with an embodiment, the browser extension is installed to the software application (e.g., web browser); and any required settings modified (e.g., a URL used to communicate with the analytics system, login settings, or display preferences).

Figure 8:
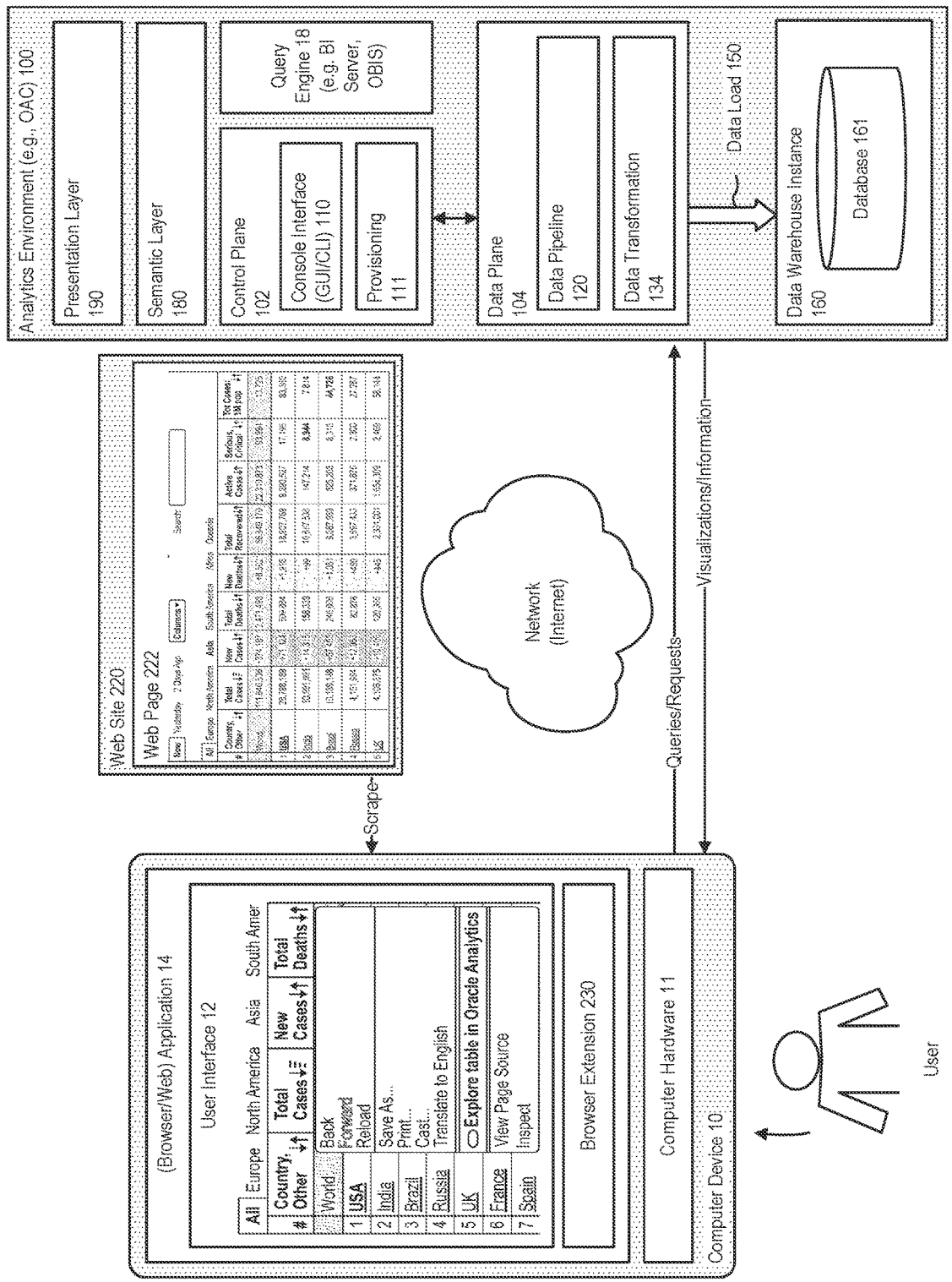
FIG. 8 further illustrates the use of a browser extension for data exploration in an analytics environment, in accordance with an embodiment.

FIG. 8 further illustrates the use of a browser extension for data exploration in an analytics environment, in accordance with an embodiment.

As illustrated in FIG. 8, in accordance with an embodiment, a user can elect to use a browser extension to explore a table of interest at an online data content resource, such as at a web site or web page, and instruct the browser extension to import, sanitize, and begin analysis of the table within the analytics environment.

Figure 9:
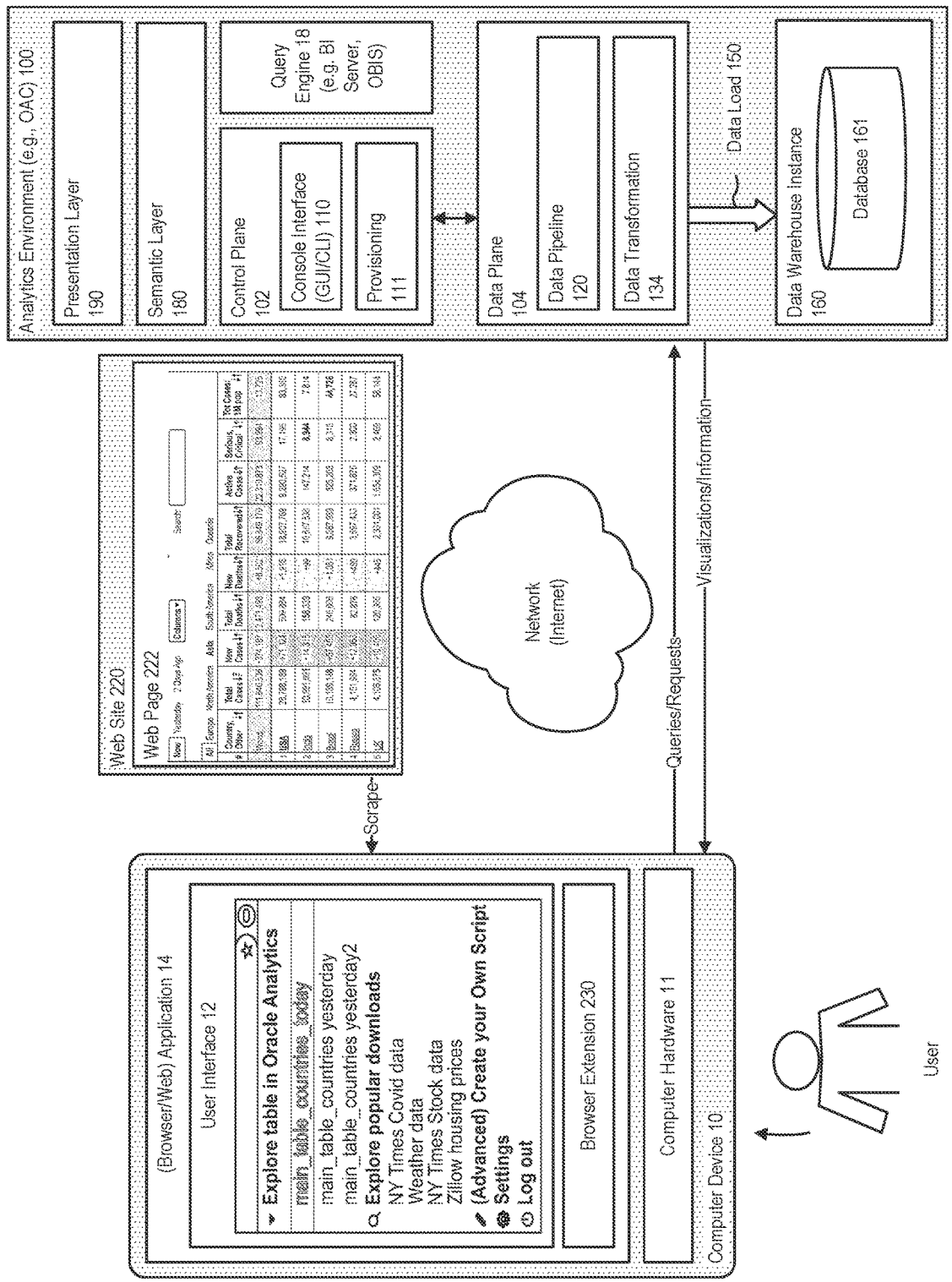
FIG. 9 further illustrates the use of a browser extension for data exploration in an analytics environment, in accordance with an embodiment.
Figure 10:
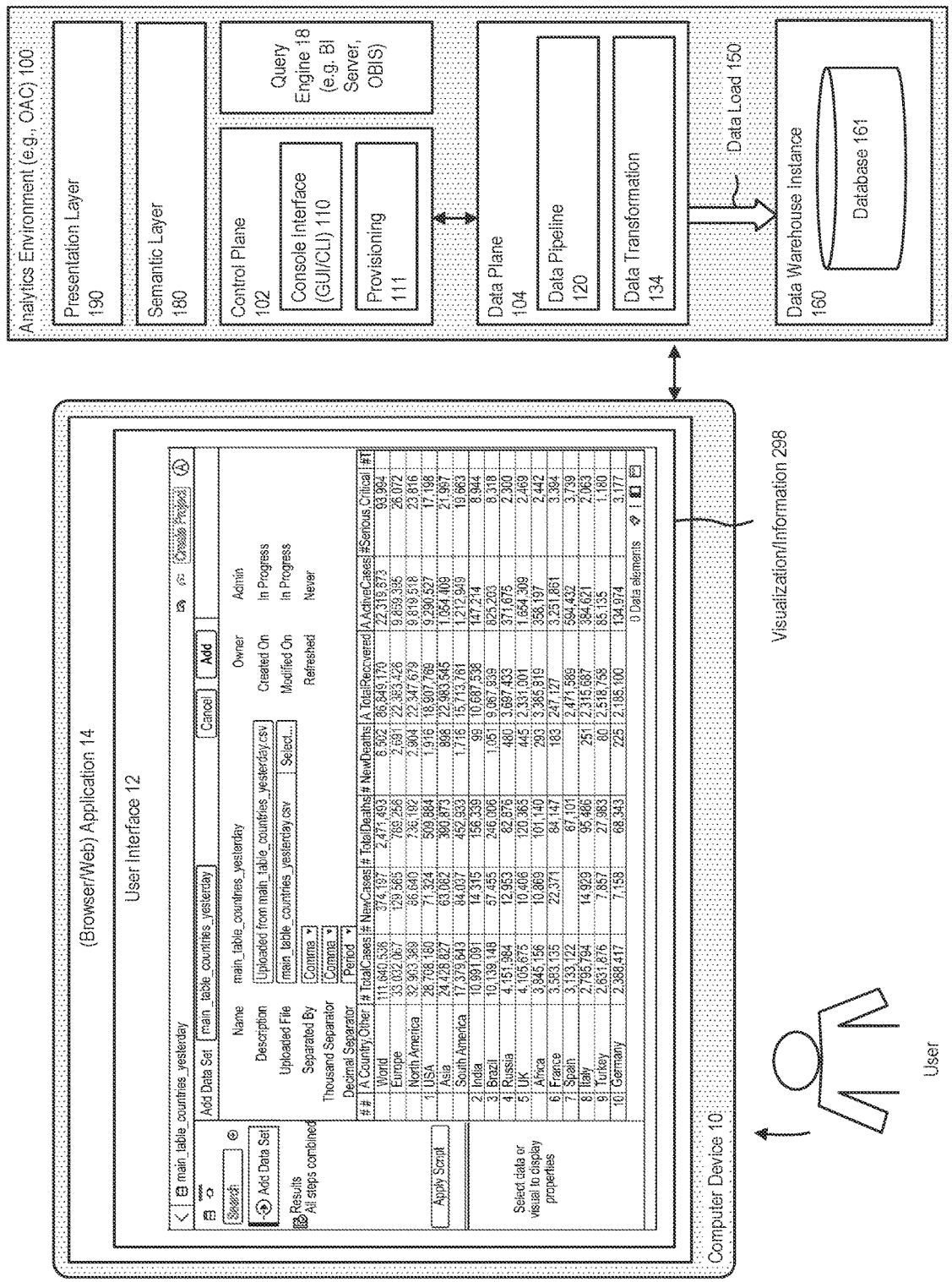
FIG. 10 further illustrates the use of a browser extension for data exploration in an analytics environment, in accordance with an embodiment.
Figure 11:
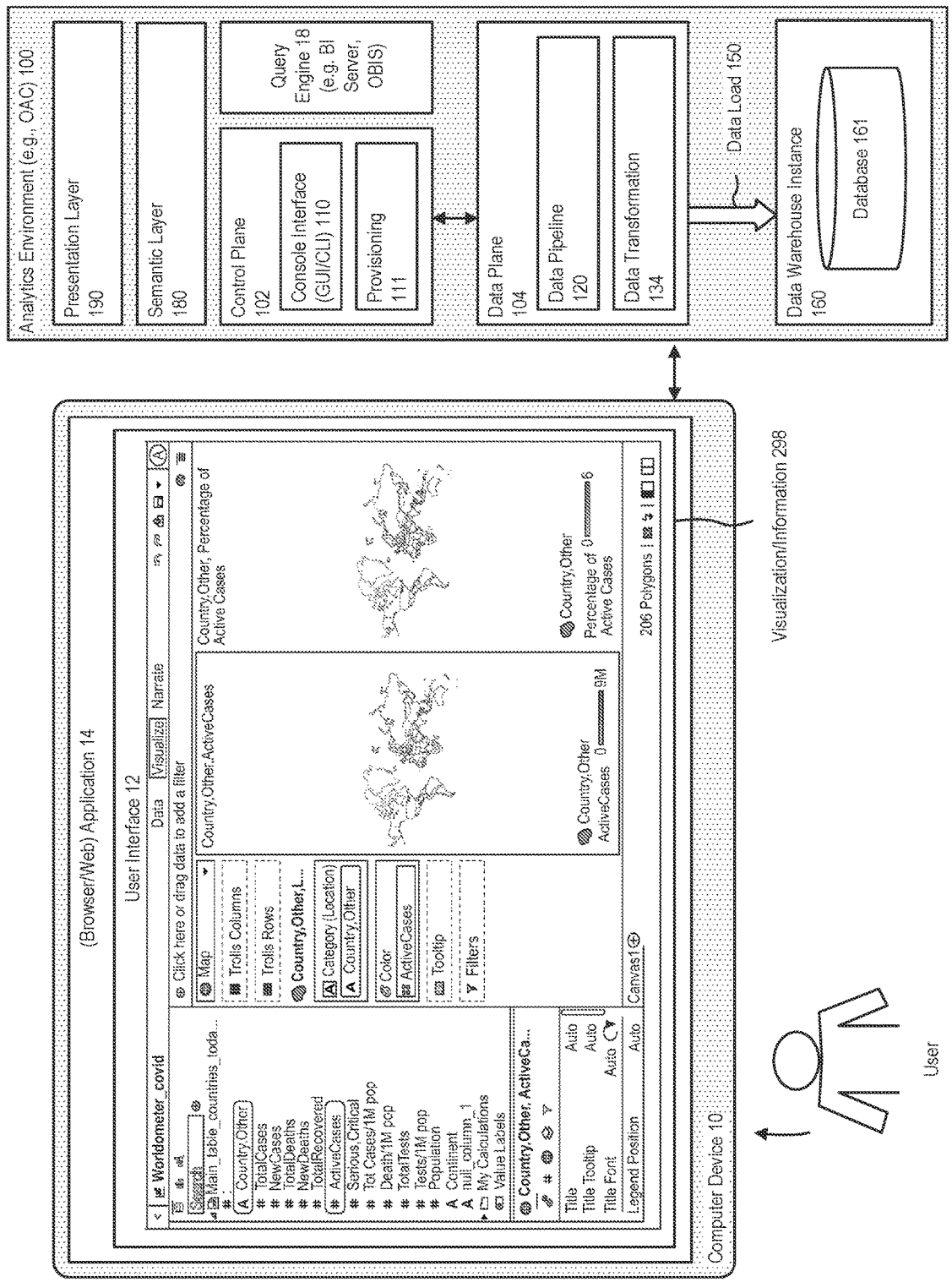
FIG. 11 further illustrates the use of a browser extension for data exploration in an analytics environment, in accordance with an embodiment.
Figure 12:
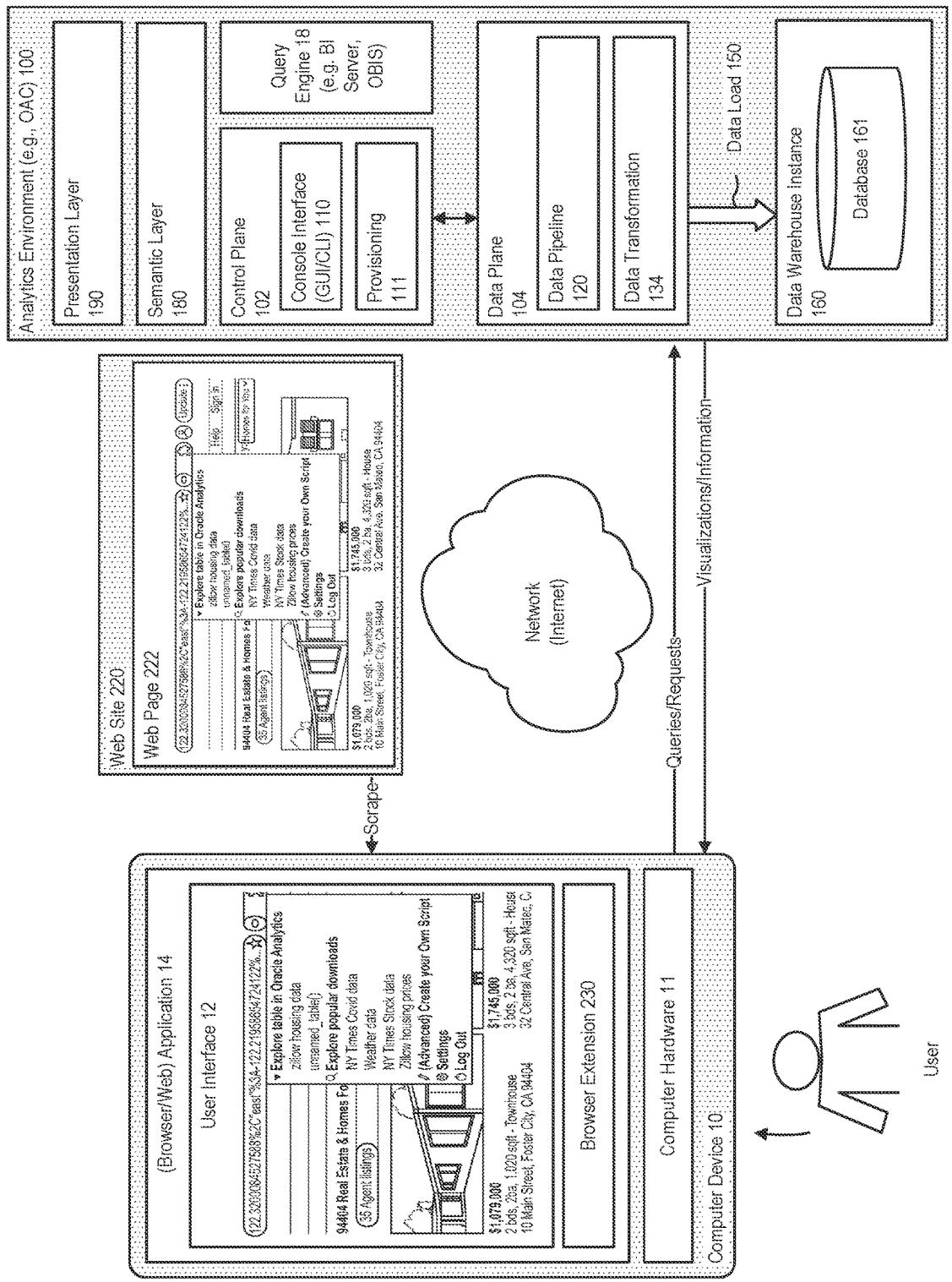
FIG. 12 further illustrates the use of a browser extension for data exploration in an analytics environment, in accordance with an embodiment.
Figure 13:
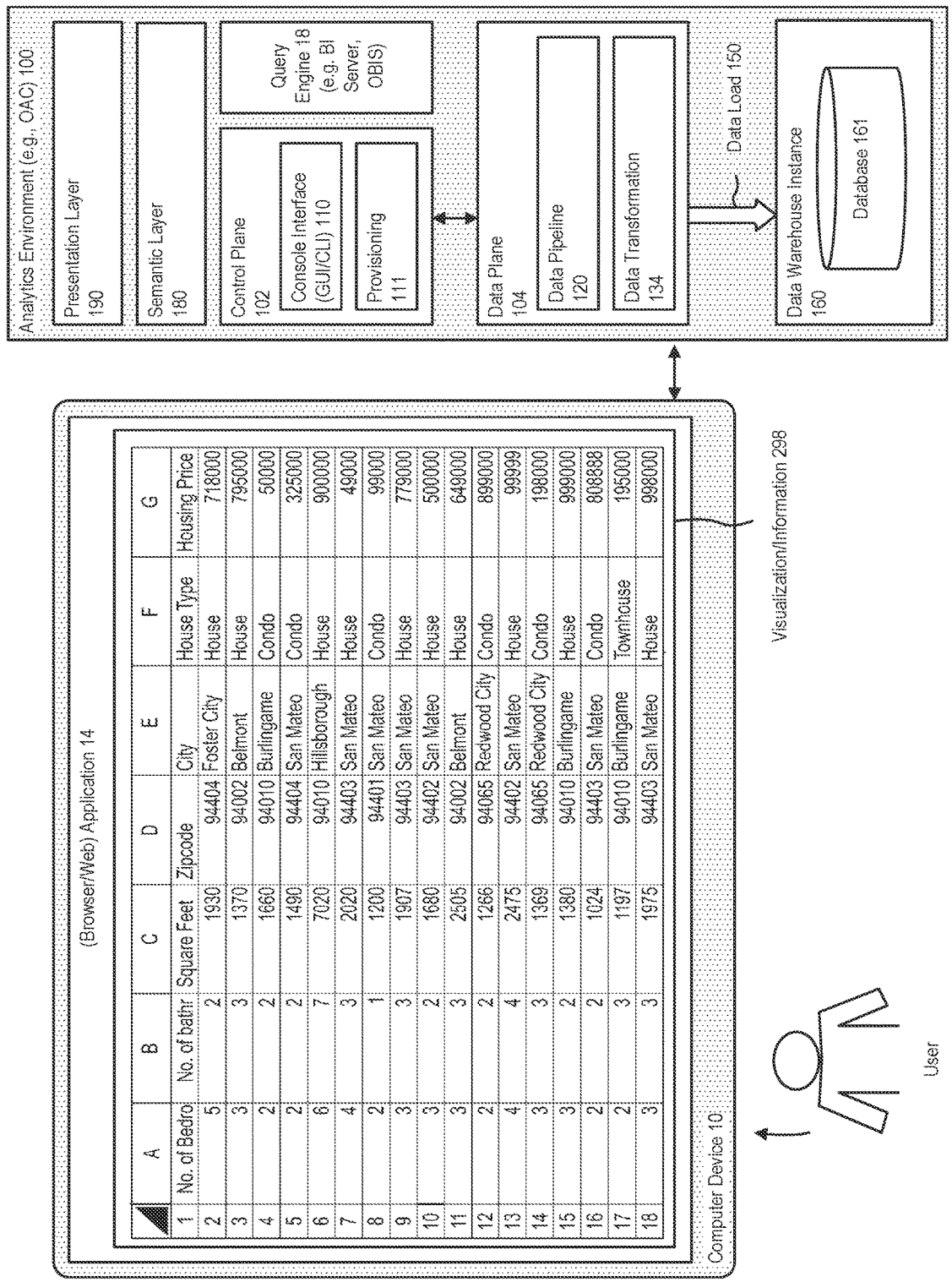
FIG. 13 further illustrates the use of a browser extension for data exploration in an analytics environment, in accordance with an embodiment.
Figure 14:
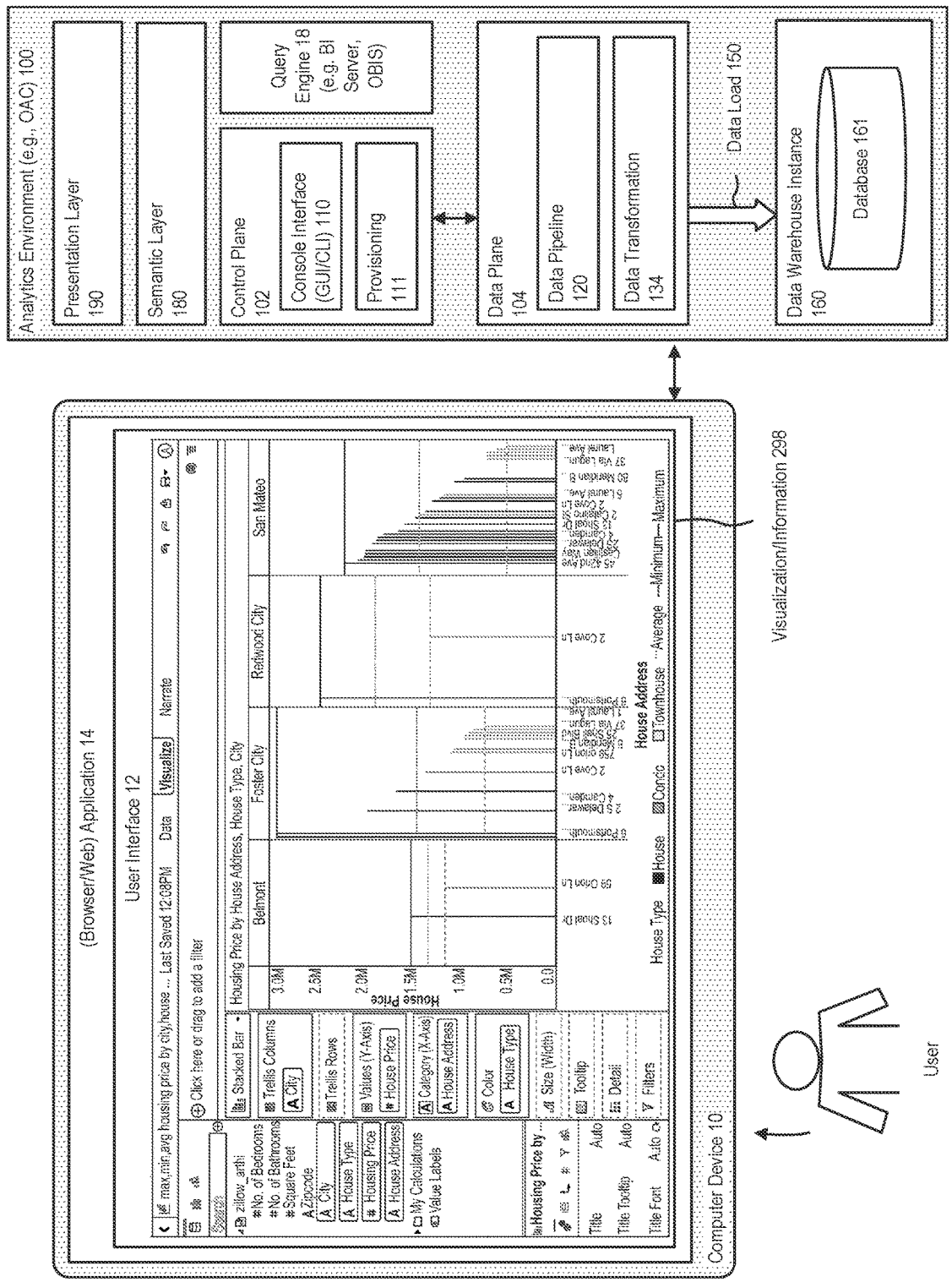
FIG. 14 further illustrates the use of a browser extension for data exploration in an analytics environment, in accordance with an embodiment.

FIG. 9 further illustrates the use of a browser extension for data exploration in an analytics environment, in accordance with an embodiment.

As illustrated in FIG. 9, in accordance with an embodiment, alternatively a user can elect to use a context menu to explore a table or other arrangements of data at an online data content resource in the analytics environment.

FIGS. 10-14 further illustrates the use of a browser extension for data exploration in an analytics environment, in accordance with an embodiment.

As illustrated in FIGS. 10-14, in accordance with an embodiment, table information associated with an online data content resource such as a web page at a web site that includes a particular table or other arrangement of data, and provided via the browser extension, can be used by the analytics system to prepare one or more views or other visualizations or other information associated with a set of data, which can then be used by the client device/user or by another device or user.

Figure 15:
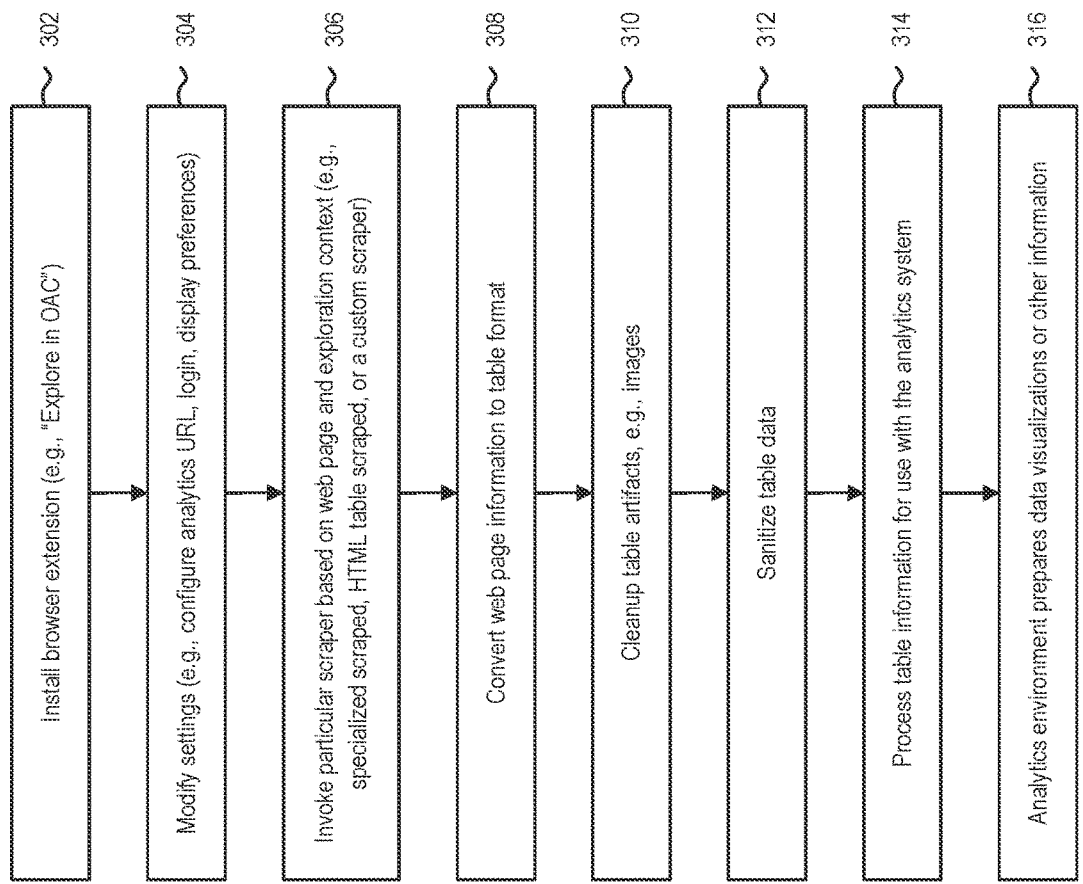
FIG. 15 illustrates a process for use of a browser extension for data exploration in an analytics environment, in accordance with an embodiment.

FIG. 15 illustrates a process for use of a browser extension for data exploration in an analytics environment, in accordance with an embodiment.

As illustrated in FIG. 15, in accordance with an embodiment, the process includes, at step 302, the browser extension is installed to the software application (e.g., web browser); and at step 304 any required settings modified (e.g., a URL used to communicate with the analytics system, login settings, or display preferences).

At step 306, the user can elect to use a browser extension to explore a table of interest at an online data content resource, such as at a web site or web page, and, at step 308, invoke a data scraper that is appropriate to the particular type of online data content resource, to quickly and easily retrieve tables or other arrangements of data from the online data content resource into the analytics environment.

At step 308, the information provided by the online data content resource, such as a table of interest at an online data content resource, such as at a web site or web page, can be converted to a table format, based on the operation of the scraper used with that online data content resource At step 310, table artifacts (e.g., images) can be cleaned-up if necessary; and at step 312, the table data sanitized.

At step 314, the table information is processed for use with the analytics system.

At step 316, the analytics system prepares one or more views or other visualizations or other information associated with a set of data, which can then be used by the client device/user or by another device or user.

In accordance with various embodiments, the teachings herein may be conveniently implemented using one or more conventional general purpose or specialized computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the teachings herein can include a computer program product which is a non-transitory computer readable storage medium (media) having instructions stored thereon/in which can be used to program a computer to perform any of the processes of the present teachings. Examples of such storage mediums can include, but are not limited to, hard disk drives, hard disks, hard drives, fixed disks, or other electromechanical data storage devices, floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems, or other types of storage media or devices suitable for non-transitory storage of instructions and/or data.

The foregoing description has been provided for the purposes of illustration and description. It is not intended to be exhaustive or to limit the scope of protection to the precise forms disclosed. Many modifications and variations will be apparent to the practitioner skilled in the art.

For example, although several of the examples provided herein illustrate operation of an analytics environment with an enterprise software application or data environment such as, for example, an Oracle Fusion Applications environment; or within the context of a software-as-a-service (SaaS) or cloud environment such as, for example, an Oracle Analytics Cloud environment; in accordance with various embodiments, the systems and methods described herein can be used with other types of enterprise software application or data environments, cloud environments, cloud services, cloud computing, or other computing environments.

The embodiments were chosen and described in order to best explain the principles of the present teachings and their practical application, thereby enabling others skilled in the art to understand the various embodiments and with various modifications that are suited to the particular use contemplated. It is intended that the scope be defined by the following claims and their equivalents.

What is claimed is:

1. A system for providing a browser extension for exploration in an analytics environment, comprising:
    a computer device including a processor and software application operating thereon as a web browser or software application that enables access to an online data content resource;
    a browser extension provided at the software application that enables a user to explore a table of interest and instruct the browser extension to import, sanitize, and begin analysis of the table within the analytics environment;
    wherein the browser extension operates to identify the table of interest included in the online source and provide, as selectable options, a complete version of table of interest and a partial version of the table of interest through use of a data mapping tool, wherein the browser extension operates to select, from an accessible library of a plurality of data mapping tools, the data mapping tool of the plurality of data mapping tools, the data mapping tool being adapted for use on the table of interest;
    wherein the browser extension operates to receive a selection of one of the selectable options; and
    wherein the computer device communicates with the analytics environment to retrieve data indicative of the selection of one of the selectable options in a form of a table or other arrangement of data from the online data content resource, for use by the analytics environment in preparing one or more views or other visualizations or other information associated with a set of data.

2. The system of claim 1, wherein the user can elect to use the browser extension to explore a table of interest at an online data content resource provided as a web site or web page, and instruct the browser extension to import, sanitize, and begin analysis of the table within the analytics environment.

3. The system of claim 1, wherein the browser extension can invoke a data scraper that is appropriate to the particular type of online data content resource, to retrieve tables or other arrangements of data from the online data content resource into the analytics environment.

4. The system of claim 1, wherein the browser extension operates to identify data tables included on a web site or web page, and present options to a user of the program to pull one, some, or all of the data tables into an analytics environment.

5. A method for providing a browser extension for exploration in an analytics environment, comprising:
    providing at a computer device including a processor a software application operating thereon as a web browser or software application that enables access to an online data content resource;
    providing at the software application a browser extension that enables a user to explore a table of interest and instruct the browser extension to import, sanitize, and begin analysis of the table within the analytics environment;
    identifying, by the browser extension, the table of interest included in the online source and provide, as selectable options, a complete version of table of interest and a partial version of the table of interest through use of a data mapping tool, wherein the browser extension operates to select, from an accessible library of a plurality of data mapping tools, the data mapping tool of the plurality of data mapping tools, the data mapping tool being adapted for use on the table of interest;
    receiving, at the browser extension, a selection of one of the selectable options; and
    communicating with the analytics environment to retrieve data indicative of the selection of one of the selectable options in a form of a table or other arrangement of data from the online data content resource, for use by the analytics environment in preparing one or more views or other visualizations or other information associated with a set of data.

6. The method of claim 5, wherein the user can elect to use the browser extension to explore a table of interest at an online data content resource provided as a web site or web page, and instruct the browser extension to import, sanitize, and begin analysis of the table within the analytics environment.

7. The method of claim 5, wherein the browser extension can invoke a data scraper that is appropriate to the particular type of online data content resource, to retrieve tables or other arrangements of data from the online data content resource into the analytics environment.

8. The method of claim 5, wherein the browser extension operates to identify data tables included on a web site or web page, and present options to a user of the program to pull one, some, or all of the data tables into an analytics environment.

9. A non-transitory computer readable medium including instructions for providing a browser extension for exploration in an analytics environment, comprising:
    providing at a computer device including a processor a software application operating thereon as a web browser or software application that enables access to an online data content resource;
    providing at the software application a browser extension that enables a user to explore a table of interest and instruct the browser extension to import, sanitize, and begin analysis of the table within the analytics environment;

identifying, by the browser extension, the table of interest included in the online source and provide, as selectable options, a complete version of table of interest and a partial version of the table of interest through use of a data mapping tool, wherein the browser extension operates to select, from an accessible library of a plurality of data mapping tools, the data mapping tool of the plurality of data mapping tools, the data mapping tool being adapted for use on the table of interest;

receiving, at the browser extension, a selection of one of the selectable options; and communicating with the analytics environment to retrieve data indicative of the selection of one of the selectable options in a form of a table or other arrangement of data from the online data content resource, for use by the analytics environment in preparing one or more views or other visualizations or other information associated with a set of data.

10. The non-transitory computer readable medium of claim 9, wherein the user can elect to use the browser extension to explore a table of interest at an online data content resource provided as a web site or web page, and instruct the browser extension to import, sanitize, and begin analysis of the table within the analytics environment.

11. The non-transitory computer readable medium of claim 9, wherein the browser extension can invoke a data scraper that is appropriate to the particular type of online data content resource, to retrieve tables or other arrangements of data from the online data content resource into the analytics environment.

12. The non-transitory computer readable medium of claim 9, wherein the browser extension operates to identify data tables included on a web site or web page, and present options to a user of the program to pull one, some, or all of the data tables into an analytics environment.

* * * * *